No. 885,139. PATENTED APR. 21, 1908.
E. A. BROWN.
PIPE BENDER.
APPLICATION FILED SEPT. 6, 1907.
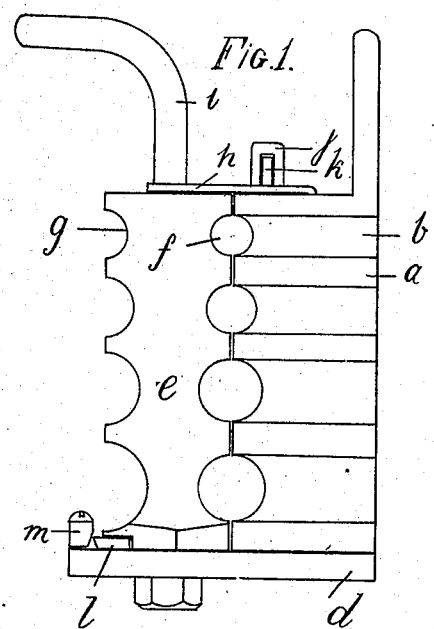
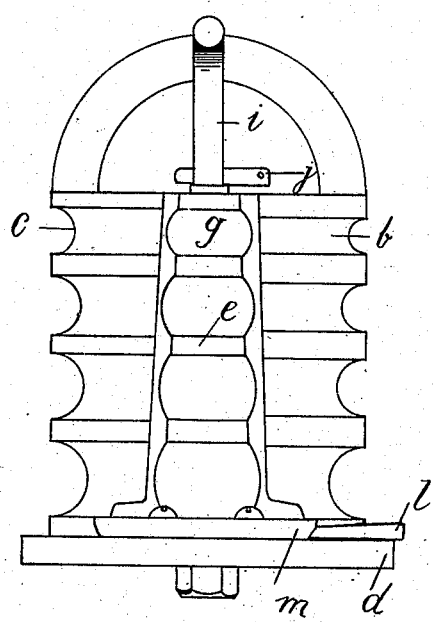
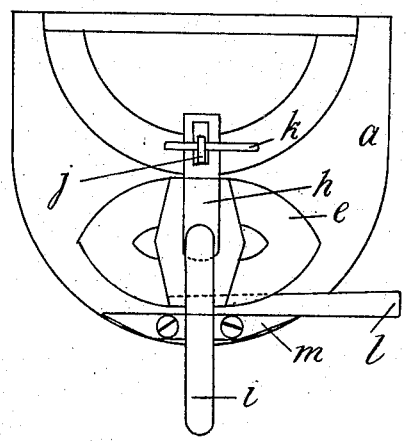
Witnesses.
F. G. Hughes
Howard L. Wilson
Inventor.
Ernest Argyle Brown
per. G. B. Stoward
Attorney

UNITED STATES PATENT OFFICE.

ERNEST ARGYLE BROWN, OF WEALDSTONE, ENGLAND.

PIPE-BENDER.

No. 885,139.　　　　　Specification of Letters Patent.　　　Patented April 21, 1908.

Application filed September 6, 1907. Serial No. 391,669.

*To all whom it may concern:*

Be it known that I, ERNEST ARGYLE BROWN, a subject of the King of the United Kingdom of Great Britain and Ireland, residing at 34 Havelock road, Wealdstone, in the county of Middlesex, in that part of the United Kingdom called England, have invented new and useful Improvements in Portable Pipe-Benders, of which the following is a specification.

This invention relates to improvements in portable pipe-benders and more particularly it has reference to that class of pipe-benders wherein the pipe is pushed and bent gradually between grooves on a semi-cylinder against which the pipe is held by a grooved pillar, and still more particularly it relates to a modification of the semi-cylinder and of the pillar so that the half of the semi-cylinder which is at present scarcely used can be adapted to another set of pipe gages, thus rendering the appliance doubly as useful as is the present form, and consequently rendering one bender as good as two of the usual form. I attain this object in the manner shown by the accompanying drawings, in which Figure 1 is a side view Fig. 2 a front view and Fig. 3 a plan.

I provide a semi-cylinder $a$, one half of which has grooves $b$, of different widths to those on the other half as at $c$, the grooves in each case being semi-circular or thereabout. The semi-cylinder $a$ is attached to or formed integral with a base $d$ which projects beyond the curved side of $a$. Fixed by a square pin fitting in a hole in the base $d$ is a pillar $e$ having on one edge grooves $f$ corresponding to one of the two sets of grooves on $a$, and on the other edge $g$, another set of grooves corresponding to the other of the two sets on $a$. The upper end of the pillar $e$ is attached to the semi-cylinder $a$ by a strap or bar $h$ in a hole in which the handle $i$ can turn.

The mode of attaching the bar $h$ to the semi-cylinder $a$ may be by providing a loop or eye $j$ upstanding from $a$ over which is placed a slot at the end of the bar $h$, a wedge or pin $k$ inserted through the eye $j$ keeping the parts in place.

To reduce liability of the pipe to break while being bent, I make the pillar so that it can be moved away from the semi-cylinder to a limited extent. This may be provided for by any suitable means, a convenient one being to have a wedge $l$ acting between the pillar and a projection $m$ on the base $d$, the hole for the pin on pillar being slotted.

What I claim as my invention and desire to secure by Letters Patent is:—

In a pipe-bender of the class which comprises a grooved semi-cylinder between which and a grooved pillar the pipe is placed during the act of bending, a semi-cylinder having two sets of grooves for pipes of various gages, a reversible pillar with two sets of grooves corresponding to those in the semi-cylinder, and means for adjusting the distance between the semi-cylinder and the pillar, substantially as hereinbefore described.

In testimony whereof I have signed my name to this specification in the presence of two subscribing witnesses.

ERNEST ARGYLE BROWN.

Witnesses:
　D. M. EDWARDS,
　F. G. HUGHES.